United States Patent [19]

Burns et al.

[11] Patent Number: 4,752,404

[45] Date of Patent: Jun. 21, 1988

[54] BLENDS OF WATER SOLUBLE POLYMERS

[75] Inventors: Lyle D. Burns, Bartlesville; Billy L. Swanson, Delaware, both of Okla.

[73] Assignee: Phillips Petroleum Company, Bartlesville, Okla.

[21] Appl. No.: 21,832

[22] Filed: Mar. 4, 1987

[51] Int. Cl.⁴ ............................................. E21B 43/27
[52] U.S. Cl. .................................. 252/8.553; 166/307
[58] Field of Search ............................ 252/8.553, 8.551

[56] References Cited

U.S. PATENT DOCUMENTS

| | | | |
|---|---|---|---|
| 4,024,040 | 5/1977 | Phalangas et al. | 204/159.22 |
| 4,055,502 | 10/1977 | Swanson | 252/8.553 |
| 4,191,657 | 3/1980 | Swanson | 252/8.55 C |
| 4,476,033 | 10/1984 | Josephson | 252/8.55 C |
| 4,578,201 | 5/1986 | Burns et al. | 252/8.55 C |

*Primary Examiner*—Herbert B. Guynn
*Attorney, Agent, or Firm*—Hal Brent Woodrow

[57] ABSTRACT

Blends of water soluble polymers containing varying ratios of acrylamide and sodium 2-acrylamido-2-methylpropane sulfonate are provided which synergistically increase the viscosity of acidic solutions. Improved methods of matrix acidizing and fracture acidizing are also provided.

19 Claims, No Drawings

BLENDS OF WATER SOLUBLE POLYMERS

The present invention pertains to blends of water soluble polymers which are useful in fracture or matrix acidizing subterranean formations. Another aspect of the invention pertains to improved thickened acidic compositions. A further aspect of the invention pertains to an improved process for fracture acidizing subterranean formations. Still yet another aspect of the invention pertains to an improved process for matrix acidizing subterranean formations.

The use of thickened acidic solutions in fracture or matrix acidizing formations is well known to those skilled in the art. A solution containing water, acid, and a water soluble polymer is injected into the formation. This creates channels in the subterranean formation which thereby increases oil and gas production.

It is also known to those skilled in the art, that these operations are quite expensive. One major source of this expense is the large quantities of water soluble polymers required in order to insure a solution of sufficient viscosity to create channels in the subterranean formation.

Thus, it would be a valuable contribution to the art to develop thickened acidic solutions having increased viscosities, which would allow fracture and matrix acidizing operations to be conducted with decreased quantities of water soluble polymers.

It is an object of the present invention to provide thickened acidic solutions having an increased viscosity. It is a further object of the present invention to provide blends of water soluble polymers possessing a synergistic viscosifying effect. It is yet another object of the present invention to provide an improved process for acid fracturing subterranean formations. It is still a further object of the present invention to provide an improved process for matrix acidizing subterranean formations.

In accordance with the present invention, it has been discovered that when a water soluble copolymer containing about 50 weight percent of at least one monomer selected from the group consisting of acrylamide or methacrylamide and about 50 weight percent of at least one monomer selected from the group consisting of sodium 2-acrylamido-2-methylpropane sulfonate or 2-acrylamido-2-methylpropane sulfonic acid, is dry blended with a second water soluble copolymer containing about 30 weight percent of at least one monomer selected from the group consisting of acrylamide or methacrylamide and about 70 weight percent of at least one monomer selected from the group consisting of sodium 2-acrylamido-2-methylpropane sulfonate or 2-acrylamido-2-methylpropane sulfonic acid, that the resulting blend is capable of producing a synergistic increase in the viscosities of acidic solutions when compared with either of the above-described copolymers alone.

The preferred blends of the present invention are those which contain from 60 to 90 weight percent of Copolymer A, wherein this copolymer contains about 50 weight percent of acrylamide and about 50 weight percent of sodium 2-acrylamido-2-methylpropane sulfonate, and from 10 to 40 weight percent of Copolymer B, wherein Copolymer B contains about 30 weight percent of acrylamide and about 70 weight percent of sodium 2-acrylamido-2-methylpropane sulfonate.

Both copolymers A and B as well as their methods of preparation are known in the art. They are available from numerous commercial suppliers.

Although neither the molecular weight nor the manner in which the copolymers are formed is critical to the practice of the present invention, it is presently preferred that Copolymer A be capable of producing a solution with an apparent viscosity of about 12 centipoise at 170 sec$^{-1}$ on a Fann 35 rotational viscometer using an R1 rotor, a B1 bob, and an F1 spring, when 1.2 gm of the copolymer is dissolved in a 250 ml solution of 28 weight percent hydrochloric acid at 75° F. Likewise it is presently preferred that Copolymer B be capable of producing a solution with an apparent viscosity of about 8 centipoise at 170 sec$^{-1}$ on a Fann 35 rotational viscometer using an R1 rotor, a B1 bob, and an F1 spring under identical conditions. An acceptable manner for calculating these apparent viscosities is demonstrated in Example II of this application.

A preferred manner of preparing the blend is to dry blend the desired ratios of Copolymer A and B together.

The blends of the present invention are useful in either the fracture acidizing or the matrix acidizing of subterranean formations. These processes are well known in the art and the exact procedure followed is not critical to the practice of the present invention. Generally, though, the process will entail dissolving the blend of the present invention in an acidic solution and pumping the resulting mixture into a subterranean formation under pressure.

Any of the acids which are conventionally used in fracture or matrix acidizing are suitable for use with the blends of the present invention. Representative examples of suitable acids can be selected from the group consisting of hydrochloric acid, phosphoric acid, nitric acid, sulfuric acid, sulfamic acid, hydrofluoric acid, formic acid, acetic acid, propionic acid, butyric acid, chloracetic acid and chloropropionic acid or mixtures thereof. Hydrochloric acid is presently most preferred.

Occasionally, it is desirable to use a crosslinking agent in a fracture or matrix acidizing operation. The blends of the present invention are suitable for use with any of the crosslinking agents which are conventionally used in fracture or matrix acidizing operations. Representative examples of suitable crosslinking agents can be selected from the group consisting of formaldehyde, acetaldehyde, paraformaldehyde, propionaldehyde, butyraldehyde, isobutyraldehyde, valeraldehyde, heptaldehyde, decanal, glyoxal, glutaraldehyde, succinaldehyde, terephthaldehyde, sucrose, fructose, titanium acetylacetonate, zirconium oxychloride, and zirconium lactate. The blend is also suitable for use with redox crosslinking systems involving for instance, sodium dichromate and sodium bisulfite or sodium hydrosulfite.

It is presently preferred that the components of the fracture or matrix acidizing solutions of the present invention be present in the following quantities:

TABLE I

| | Broad Range (wt %) | Preferred Range (wt %) |
|---|---|---|
| Blend | 0.01–5 | 0.1–2 |
| Acid | 3–37 | 15–28 |
| Water | 58–97 | 70–85 |
| Crosslinker (optional) | 0–5 | 0.004–2 |

The blends of the present invention are suitable for use in hostile environments. The term hostile environment as used in this application is meant to include conditions such as pumping under high shear rates, low pH, high temperatures, and hard brines.

The blends are stable under the high shear rates commonly encountered in pumping operations. For instance, they are easily stable at shear rates of 10 to 60 barrels per minute down various sizes of tubing for periods of time long enough to reach the well bottom in wells up to 1,000 to 40,000 feet deep.

The blends and their resulting solutions are stable over a broad temperature range. They are stable from ambient temperature up to 400° F.

The blends and their resulting solutions are also stable in hard brines. By hard brine, we mean any aqueous solution of mineral salts having greater than 2,000 ppm of dissolved electrolytes such as are frequently present in a spent acid fluid. A spent acid fluid is created when the thickened acidic solution reacts with the limestone or dolomite present in the subterranean formation. These spent acid solutions commonly contain varying amounts of calcium or magnesium salts.

The blend and its resulting solutions are also stable for extended periods of time at pH's as low as 1.

The blends of the present invention are also suitable for use with the sequestering agents that are occasionally used in fracture or matrix acidizing operations. Commonly used sequestering agents can be selected from the group consisting of ascorbic acid, erythorbic acid, hydrozine salt, iodide salts, EDTA, HEDTA, citric acid, or lactic acid.

The blends of the present invention are also suitable for use with surfactants, inert gases, corrosion inhibitors, emulsifying agents, friction reducers, fluid loss additives, and other conventional additives which are commonly added to fracture or matrix acidizing solutions.

The following examples are intended to further illustrate the invention, but should not be considered as unduly limiting.

EXAMPLE I

The purpose of this example is to demonstrate a method for preparing the blends of the present invention.

A copolymer (Copolymer A) containing 50 weight percent acrylamide and 50 weight percent of sodium 2-acrylamido-2-methylpropane sulfonate was obtained from the Nitto Corporation of Japan.

A second copolymer (Copolymer B) containing 30 weight percent of acrylamide and 70 weight percent of sodium 2-acrylamido-2-methylpropane sulfonate was obtained from the Hercules Corporation of Delaware.

A blend (Blend #1) containing 70 weight percent of Copolymer A and 30 weight percent of Copolymer B was prepared by dry blending together 1.26 gm of Copolymer A and 0.54 gm of Copolymer B.

A second blend (Blend #2) containing an identical ratio of Copolymer A to Copolymer B was prepared by dry blending together 0.84 gm of Copolymer A and 0.36 gm of Copolymer B.

A third blend (Blend #3) containing 90 weight percent of Copolymer A and 10 weight percent of Copolymer B was prepared by dry blending together 1.62 gm of Copolymer A and 0.18 gm of Copolymer B.

EXAMPLE II

The purpose of this example is to demonstrate that the blends of the present invention will synergistically increase the viscosity of acidic solutions.

A series of blends were prepared in a manner identical to that in Example I.

For comparative purposes, a series of control test samples were also prepared. The control test samples contained either 1.2 gm or 1.8 gm of only Copolymer A or Copolymer B.

Each of the blends and its corresponding controls were dissolved in 250 ml of a 28 weight percent solution of hydrochloric acid. To facilitate the dispersion of the polymers, the solutions were mechanically stirred for 5 minutes.

After the solutions were stirred, they were allowed to sit for 5 minutes. They were then heated to a temperature of 75° F. and were maintained at that temperature throughout the tests by wrapping the vessel in heating tape.

After reaching 75° F., the viscosity of the solutions were determined with a Fann 35 rotational viscometer, using an R1 rotor, a B1 bob, and an F1 spring. The viscosities of the solutions were measured at 100 rpm, 200 rpm, 300 rpm and 600 rpm on the Fann 35 rotational viscometer.

Based on the dial readings and the rotational speed of the Fann 35 viscometer, the rheological characteristics of the solutions were calculated in the following manner.

The shear rate and shear stress values were determined according to the following equations:

$$\gamma = 1.7033(N)$$

where
$\gamma$ = shear rate, $\sec^{-1}$
N = rotational speed, rpm $$Y = 0.01066(\theta)$$

where
Y = shear stress, $LbF/ft^2$
$\theta$ = dial reading

The log of the shear stress was then plotted against the log of the shear rate. A linear regression analysis of this data provided values for the flow behavior index (n) and the consistency index (K). The slope of the line is equivalent to the flow behavior index (n). The antilog of the intercept is the consistency index (K). The apparent viscosity was then calculated according to the following equation:

$$\mu = 47874 K(\gamma)^{n-1}$$

where
$\mu$ = apparent viscosity, cp
The following data was generated.

TABLE II

| Polymer | Fann 35 Dial Read (rpm) | | | | n | K | Apparent Viscosity (in centipoise) | |
|---|---|---|---|---|---|---|---|---|
| | 600 | 300 | 200 | 100 | | | 170 $\sec^{-1}$ | 511 $\sec^{-1}$ |
| Copolymer A | | | | | | | | |
| 1.2 gm | 19 | 10 | 7 | 4 | 0.858 | 0.0005 | 12 | 10 |
| 1.8 gm | 32 | 18 | 12.5 | 7.5 | 0.813 | 0.0012 | 22 | 18 |

TABLE II-continued

| Polymer | Fann 35 Dial Read (rpm) | | | | n | K | Apparent Viscosity (in centipoise) | |
|---|---|---|---|---|---|---|---|---|
| | 600 | 300 | 200 | 100 | | | 170 sec$^{-1}$ | 511 sec$^{-1}$ |
| Copolymer B | | | | | | | | |
| 1.2 gm | 15 | 8 | 6 | 3 | 0.888 | 0.0003 | 8 | 7 |
| 1.8 gm | 31 | 18 | 12.5 | 7.5 | 0.796 | 0.0013 | 22 | 17 |
| Blend #2 | | | | | | | | |
| 1.2 gm | 21 | 13 | 9.5 | 6.5 | 0.663 | 0.0022 | 19 | 13 |
| Blend #1 | | | | | | | | |
| 1.8 gm | 34 | 20.5 | 15.5 | 10 | 0.681 | 0.0032 | 30 | 21 |
| Blend #3 | | | | | | | | |
| 1.8 gm | 31 | 18 | 13 | 8 | 0.758 | 0.0017 | 24 | 18 |

The above data demonstrates the blends of the present invention synergistically increase the viscosities of acidic solutions.

For example, 1.2 gm of Copolymer A had an apparent viscosity of 12 centipoise at 170 sec$^{-1}$ and 1.2 gm of Copolymer B had an apparent viscosity of 8 centipoise at 170 sec$^{-1}$. One would expect that the blend of these two polymers would have an apparent viscosity somewhere between 12 centipoise and 8 centipoise, but instead Blend #2 had an apparent viscosity of 19, an increase of nearly 33 percent.

Thus, this data demonstrates the synergistic properties which the blends of the present invention possess.

EXAMPLE III

The purpose of this example is to demonstrate that the blends of the present invention also possess synergistic properties at elevated temperatures.

A series of blends and control samples were prepared in a manner identical to those in Example II.

They were also dissolved in a 28 weight percent solution of hydrochloric acid in a manner identical to those of Example II and allowed to sit for 5 minutes.

After sitting for 5 minutes, the solutions were heated to 175° F. on a hot plate and then the viscosities of the solutions were measured on a Fann 35 viscometer in the same manner as in Example II.

The apparent viscosities of the solutions were calculated in a manner identical to that in Example II. The following data was generated.

TABLE III

| Polymer | Fann 35 Dial Read (rpm) | | | | n | K | Apparent Viscosity (in centipoise) | |
|---|---|---|---|---|---|---|---|---|
| | 600 | 300 | 200 | 100 | | | 170 sec$^{-1}$ | 511 sec$^{-1}$ |
| Copolymer A | | | | | | | | |
| 1.2 gm | 10 | 5 | 3.5 | 2.0 | 0.907 | 0.0002 | 6 | 5 |
| 1.8 gm | 15 | 9 | 6.5 | 4.0 | 0.737 | 0.0010 | 12 | 9 |
| Copolymer B | | | | | | | | |
| 1.2 gm | 9 | 4.5 | 3.0 | 1.5 | 0.999 | 0.0001 | 5 | 5 |
| 1.8 gm | 15 | 9.0 | 6.5 | 4.0 | 0.737 | 0.0010 | 12 | 9 |
| Blend #2 | | | | | | | | |
| 1.2 gm | 11.5 | 7.5 | 6.0 | 4.0 | 0.584 | 0.0021 | 12 | 8 |
| Blend #1 | | | | | | | | |
| 1.8 gm | 18 | 10 | 8 | 5.5 | 0.631 | 0.0027 | 18 | 12 |

The above data demonstrates that the blends of the present invention also synergistically increase the viscosity of acidic solutions at elevated temperatures.

For example, 1.2 gm of Copolymer A had an apparent viscosity of 6 centipoise at 170 sec$^{-1}$ and 1.2 gm of Copolymer B had an apparent viscosity of 5 centipoise at 170 sec$^{-1}$. One would expect that the blend of these two copolymers would have an apparent viscosity somewhere between 5 and 6, but instead, Blend #2 had an apparent viscosity of 12. This represents a 100 percent increase in the viscosity of the acidic solution.

Thus, this data demonstrates the synergistic properties which the blends of the present invention exhibit at elevated temperatures.

Reasonable variations can be made in view of the foregoing disclosure without departing from the spirit and the scope of the invention.

That which is claimed:

1. A blend consisting essentially of
   (a) from 60 to 90 weight percent of a water soluble Copolymer A, wherein said Copolymer A contains about 50 weight percent of acrylamide and about 50 weight percent of at least one monomer selected from the group consisting of sodium 2-acrylamido-2-methylpropane sulfonate or 2-acrylamido-2-methylpropane sulfonic acid; and
   (b) from 10 to 40 weight percent of a water soluble Copolymer B wherein said Copolymer B contains about 30 weight percent of acrylamide and about 70 weight percent of at least one monomer selected from the group consisting of sodium 2-acrylamido-2-methylpropane sulfonate or 2-acrylamido-2-methylpropane sulfonic acid.

2. The blend of claim 1 wherein said Copolymer A contains 50 weight percent of acrylamide and 50 weight percent of sodium 2-acrylamido-2-methylpropane sulfonate and is present in the quantity of 70 weight percent and Copolymer B contains 30 weight percent of acrylamide and 70 weight percent of sodium 2-acrylamido-2-methylpropane sulfonate and is present in the quantity of 30 weight percent.

3. The blend of claim 1 wherein said Copolymer A contains 50 weight percent of acrylamide and 50 weight percent of sodium 2-acrylamido-2-methylpropane sulfonate and is present in the quantity of 90 weight percent and Copolymer B contains 30 weight percent of acrylamide and 70 weight percent of sodium 2-acrylamido-2-methylpropane sulfonate and is present in the quantity of 10 weight percent.

4. The blend of claim 2 wherein
   (a) said Copolymer A produces a solution having an apparent viscosity of about 12 centipoise at 170 sec$^{-1}$ on a Fann 35 rotational viscometer using an R1 rotor, a B1 bob, and an F1 spring; when 1.2 gm of said Copolymer A is dissolved in 250 ml of a 28 weight percent solution of hydrochloric acid at a temperature of 75° F.; and
   (b) said Copolymer B produces a solution having an apparent viscosity of about 8 centipoise at 170 sec$^{-1}$ on a Fann 35 rotational viscometer using an R1 rotor, a B1 bob, and an F1 spring; when 1.2 gm of said Copolymer B is dissolved in 250 ml of a 28 weight percent solution of hydrochloric acid at a temperature of 75° F.

5. The blend of claim 3 wherein
   (a) said Copolymer A produces a solution having an apparent viscosity of about 12 centipoise at 170 sec$^{-1}$ on a Fann 35 rotational viscometer using an R1 rotor, a B1 bob, and an F1 spring; when 1.2 gm of said Copolymer A is dissolved in 250 ml of a 28 weight percent solution of hydrochloric acid at a temperature of 75° F.; and (b) said Copolymer B produces a solution having an apparent viscosity of about 8 centipoise at 170 sec$^{-1}$ on a Fann 35 rotational viscometer using an R1 rotor, a B1 bob, and an F1 spring; when 1.2 gm of said Copolymer B is dissolved in 250 ml of a 28 weight percent solution of hydrochloric acid at a temperature of 75° F.

6. A thickened acidic solution comprising
(a) from 3 to 50 weight percent of an acid;
(b) from 58 to 97 weight percent of water; and
(c) from 0.01 to 5 weight percent of a blend of water soluble polymers consisting essentially of from 60 to 90 weight percent of Copolymer A, wherein said Copolymer A contains about 50 weight percent of at least one monomer selected from the group consisting of sodium 2-acrylamido-2-methylpropane sulfonate or 2-acrylamido-2-methylpropane sulfonic acid and about 50 weight percent of acrylamide and from 10 to 40 weight percent of a Copolymer B, wherein said Copolymer B contains about 30 weight percent of acrylamide and about 70 weight percent of at least one monomer selected from the group consisting of sodium 2-acrylamido-2-methylpropane sulfonate or 2-acrylamido-2-methylpropane sulfonic acid.

7. The thickened acidic solution of claim 6 wherein there is optionally present therein from 0.001 to 5 weight percent of a crosslinker.

8. The thickened acidic solution of claim 7 wherein
(a) said acid is selected from the group consisting of hydrochloric acid, phosphoric acid, nitric acid, sulfuric acid, sulfamic acid, hydrofluoric acid, formic acid, acetic acid, propionic acid, butyric acid, chloroacetic acid, and chloropropionic acid, or mixtures thereof; and
(b) said crosslinker is selected from the group consisting of formaldehyde, acetaldehyde, paraformaldehyde, propionaldehyde, butyraldehyde, isobutyraldehyde, valeraldehyde, heptaldehyde, decanal, glyoxal, glutaraldehyde, succinaldehyde, terephthaldehyde, sucrose, fructose, sodium dichromate and sodium bisulfite, sodium dichromate and sodium hydrosulfite, or mixtures thereof.

9. The thickened acidic solution of claim 6 wherein
(a) said acid is hydrochloric acid; and
(b) said blend contains 70 weight percent of Copolymer A, wherein said Copolymer A contains 50 weight percent of acrylamide and 50 weight percent of sodium 2-acrylamido-2-methylpropane sulfonate and 30 weight percent of Copolymer B, wherein said Copolymer B contains 30 weight percent of acrylamide and 70 weight percent of sodium 2-acrylamido-2-methylpropane sulfonate.

10. The thickened acidic solution of claim 6 wherein
(a) said acid is hydrochloric acid; and
(b) said blend contains 90 percent weight of Copolymer A, wherein said Copolymer A contains 50 weight percent of acrylamide and 50 weight percent of sodium 2-acrylamido-2-methylpropane sulfonate and 10 weight percent of Copolymer B, wherein said Copolymer B contains 30 weight percent of acrylamide and 70 weight percent of sodium 2-acrylamido-2-methylpropane sulfonate.

11. The thickened acidic solution of claim 9 wherein (a) said Copolymer A produces a solution having an apparent viscosity of about 12 centipoise at 170 sec$^{-1}$ on a Fann 35 rotational viscometer using an R1 rotor, a B1 bob, and an F1 spring; when 1.2 gm of said Copolymer A is dissolved in 250 ml of a 28 weight percent solution of hydrochloric acid at a temperature of 75° F.; and
(b) said Copolymer B produces a solution having an apparent viscosity of about 8 centipoise at 170 sec$^{-1}$ on a Fann 35 rotational viscometer using an R1 rotor, a B1 bob, and an F1 spring; when 1.2 gm of said Copolymer B is dissolved in 250 ml of a 28 weight percent solution of hydrochloric acid at a temperature of 75° F.

12. The thickened acidic solution of claim 10 wherein
(a) said Copolymer A produces a solution having an apparent viscosity of about 12 centipoise at 170 sec$^{-1}$ on a Fann 35 rotational viscometer using an R1 rotor, a B1 bob, and an F1 spring; when 1.2 gm of said Copolymer A is dissolved in 250 ml of a 28 weight percent solution of hydrochloric acid at a temperature of 75° F.; and
(b) said Copolymer B produces a solution having an apparent viscosity of about 8 centipoise at 170 sec$^{-1}$ on a Fann 35 rotational viscometer using an R1 rotor, a B1 bob, and an F1 spring; when 1.2 gm of said Copolymer B is dissolved in 250 ml of a 28 weight percent solution of hydrochloric acid at a temperature of 75° F.

13. In a process for fracture or matrix acidizing subterranean formations by injecting into said formation a thickened acidic solution containing
(a) from 58 to 97 weight percent of water;
(b) from 3 to 37 weight percent of acid; and
(c) from 0.1 to 5 weight percent of at least one water soluble polymer;
the improvement which comprises using as said water soluble polymer, a blend containing essentially of from 60 to 90 weight percent of Copolymer A, wherein said Copolymer A contains about 50 weight percent of at least one monomer selected from the group consisting of sodium 2-acrylamido-2-methylpropane sulfonate or 2-acrylamido-2-methylpropane sulfonic acid and about 50 weight percent of acrylamide and from 10 to 40 weight percent of Copolymer B, wherein said Copolymer B contains about 30 weight percent of acrylamide and about 70 weight percent of at least one monomer selected from the group consisting of sodium 2-acrylamido-2-methylpropane sulfonate or 2-acrylamido-2-methylpropane sulfonic acid.

14. The process of claim 13 wherein there is optionally present therein from 0.001 to 5.0 weight percent of a crosslinker.

15. The process of claim 14 wherein
(a) said acid is selected from the group consisting of hydrochloric acid, phosphoric acid, nitric acid, sulfuric acid, sulfamic acid, hydrofluoric acid, formic acid, acetic acid, propionic acid, butyric acid, chloroacetic acid, and chloropropionic acid, or mixtures thereof; and
(b) said crosslinker is selected from the group consisting of formaldehyde, acetaldehyde, paraformaldehyde, propionaldehyde, butyraldehyde, isobutyraldehyde, valeraldehyde, heptaldehyde, decanal, glyoxal, glutaraldehyde, succinaldehyde, terephthaldehyde, sucrose, fructose, sodium dichromate and sodium bisulfite, sodium dichromate and sodium hydrosulfite, or mixtures thereof.

16. The process of claim 13 wherein
(a) said acid is hydrochloric; and
(b) said blend contains 70 weight percent of Copolymer A, wherein said Copolymer A contains 50 weight percent of acrylamide and 50 weight percent of sodium 2-acrylamido-2-methylpropane sulfonate and 30 weight percent of Copolymer B, wherein said Copolymer B contains 30 weight percent of acrylamide and 70 weight percent of sodium 2-acrylamido-2-methylpropane sulfonate.

17. The process of claim 13 wherein
(a) said acid is hydrochloric; and
(b) said blend contains 90 weight percent of Copolymer A, wherein said Copolymer A contains 50 weight percent of acrylamide and 50 weight percent of sodium 2-acrylamido-2-methylpropane sulfonate and 10 weight percent of Copolymer B, wherein said Copolymer B contains 30 weight percent of acrylamide and 70 weight percent of sodium 2-acrylamido-2-methylpropane sulfonate.

18. The proces of claim 16 wherein
(a) said Copolymer A produces a solution having an apparent viscosity of about 12 centipoise at 170 $\sec^{-1}$ on a Fann 35 rotational viscometer using an R1 rotor, a B1 bob, and an F1 spring; when 1.2 gm of said Copolymer A is dissolved in 250 ml of a 28 weight percent solution of hydrochloric acid at a temperature of 75° F.; and
(b) said Copolymer B produces a solution having an apparent viscosity of about 8 centipoise at 170 $\sec^{-1}$ on a Fann 35 rotational viscometer using an R1 rotor, a B1 bob, and an F1 spring; when 1.2 gm of said Copolymer B is dissolved in 250 ml of a 28 weight percent solution of hydrochloric acid at a temperature of 75° F.

19. The process of claim 17 wherein
(a) said Copolymer A produces a solution having an apparent viscosity of about 12 centipoise at 170 $\sec^{-1}$ on a Fann 35 rotational viscometer using an R1 rotor, a B1 bob, and an F1 spring; when 1.2 gm of said Copolymer A is dissolved in 250 ml of a 28 weight percent solution of hydrochloric acid at a temperature of 75° F.; and
(b) said Copolymer B produces a solution having an apparent viscosity of about 8 centipoise at 170 $\sec^{-1}$ on a Fann 35 rotational viscometer using an R1 rotor, a B1 bob, and an F1 spring; when 1.2 gm of said Copolymer B is dissolved in 250 ml of a 28 weight percent solution of hydrochloric acid at a temperature of 75° F.

* * * * *

UNITED STATES PATENT AND TRADEMARK OFFICE
CERTIFICATE OF CORRECTION

PATENT NO. :      4,752,404

DATED      :   June 21, 1988

INVENTOR(S) :    Lyle D. Burns and Billy L. Swanson

It is certified that error appears in the above-identified patent and that said Letters Patent is hereby corrected as shown below:

Column 7, line 13, delete "50" and insert ---37---.

Signed and Sealed this

Thirteenth Day of December, 1988

Attest:

DONALD J. QUIGG

*Attesting Officer*   *Commissioner of Patents and Trademarks*